D. O. NATION.
THERMOSTATIC TEMPERATURE REGULATOR.
APPLICATION FILED SEPT. 2, 1909.
958,157.
Patented May 17, 1910.
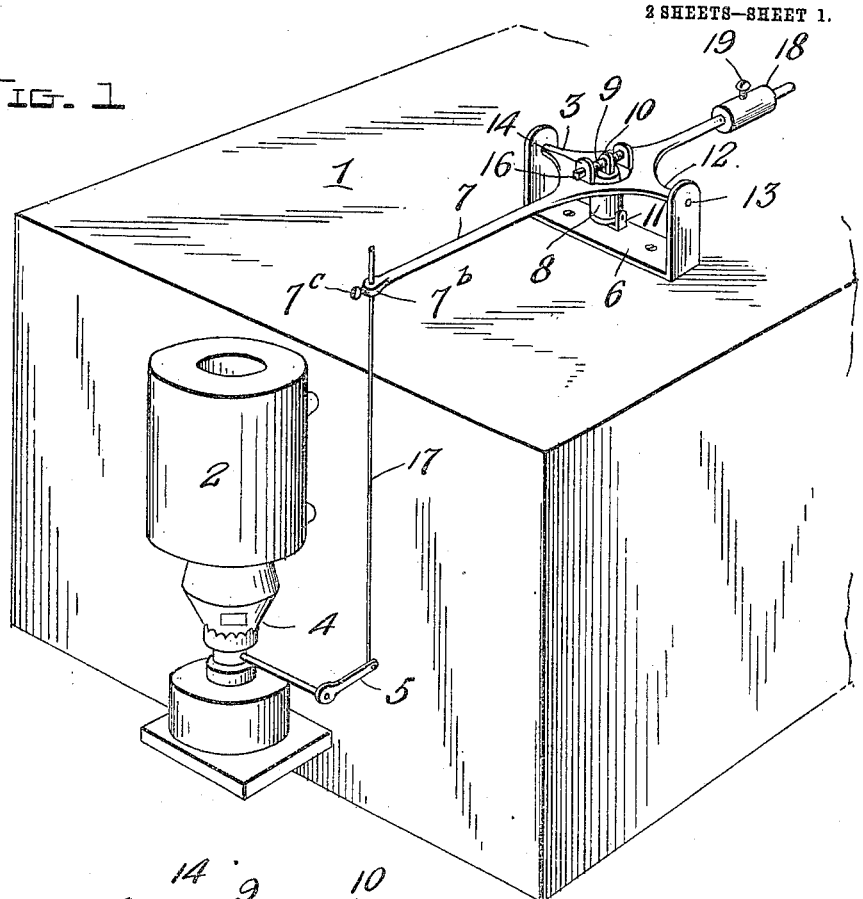
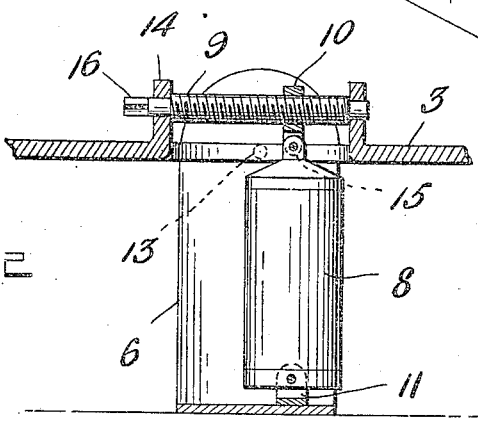

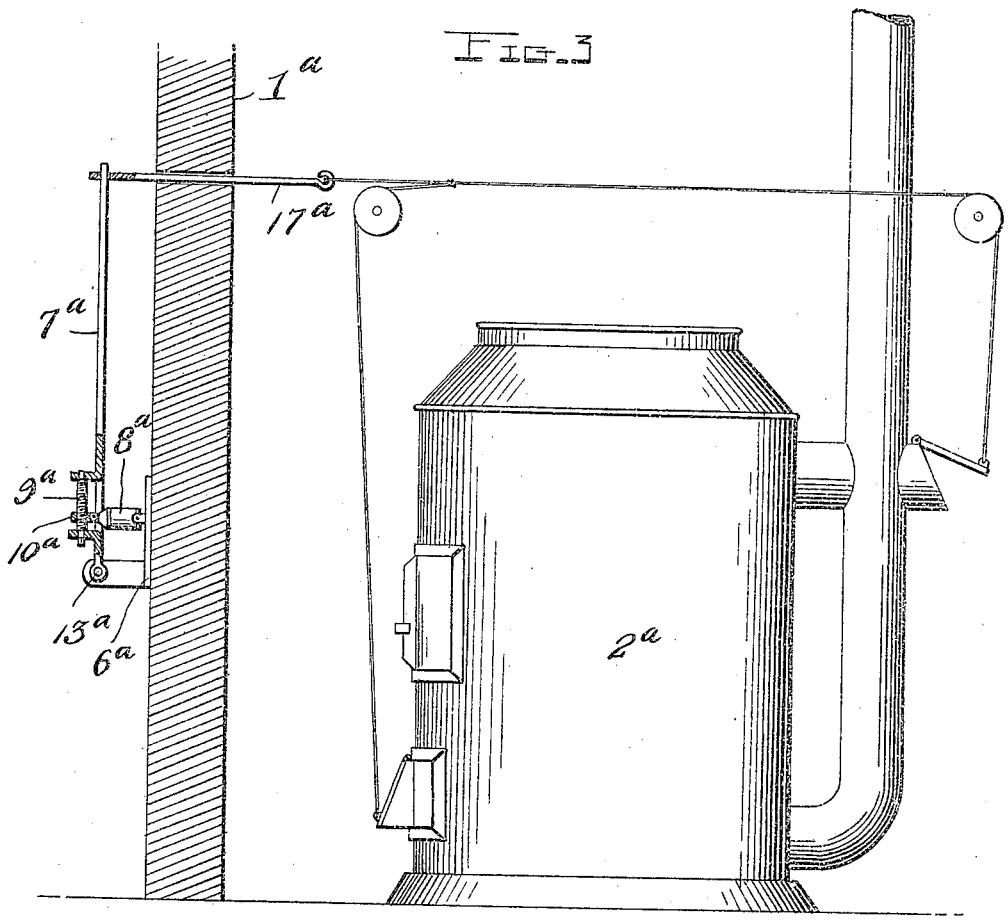

UNITED STATES PATENT OFFICE.

DON O. NATION, OF OKLAHOMA, OKLAHOMA.

THERMOSTATIC TEMPERATURE-REGULATOR.

958,157.  Specification of Letters Patent.  Patented May 17, 1910.

Application filed September 2, 1909. Serial No. 515,770.

*To all whom it may concern:*

Be it known that I, DON O. NATION, a citizen of the United States, residing at Oklahoma City, in the county of Oklahoma and State of Oklahoma, have invented certain new and useful Improvements in Thermostatic Temperature-Regulators, of which the following is a specification, reference being had to the accompanying drawings.

This invention relates to improvements in thermostatic temperature regulators.

The object of the invention is to provide a simple and practical means for controlling and regulating the heater of a chamber or compartment of any description, such means comprising a thermostatic device arranged upon the exterior of such chamber or compartment and affected by variations in the temperature of the exterior atmosphere, whereby a uniform predetermined temperature will be automatically maintained in such chamber or compartment.

With the above and other objects in view, the invention consists of the novel features of construction and the combination and arrangement of parts hereinafter fully described and claimed, and illustrated in the accompanying drawings, in which—

Figure 1 is a perspective view of a portion of an incubator and its heating apparatus showing the application of the invention thereto; Fig. 2 is an enlarged detail section showing the adjustment for the thermostat; and Fig. 3 is a sectional view through a portion of a house or building illustrating the application of the invention to the heater for the same.

Referring more particularly to Figs. 1 and 2 of the drawings, 1 denotes an incubator, 2 denotes a heating device for the same and 3 denotes one embodiment of my improved thermostatic temperature regulator arranged on the exterior of the incubator and adapted to be influenced by variations in the exterior atmosphere and to control the heater 2. As illustrated, the heating device 2 is in the form of a hot water heating system which includes an oil lamp 4 having its wick controlling stem provided with an arm 5.

The regulator 3 comprises a support 6, a lever 7, a thermostat 8, a screw 9 swiveled upon the lever and a nut 10 upon the screw and connected to the thermostat. The latter may be of any form and construction and it is preferably pivotally mounted at 11 on the support 6, which latter also preferably serves as a support for the lever 7. Said lever 7 has projecting from its opposite sides at points intermediate its ends pivot arms 12, the extremities 13 of which are rotatable in the upright portions of the support 6 and the enlarged central portion of said lever has struck up from it bearing ears 14 in which the screw 9 is swiveled, as shown more clearly in Fig. 2 of the drawings. The nut 10 is pivotally or hingedly connected, as shown at 15, to the thermostat 8 and is adapted to travel longitudinally on the screw 9 when the latter is rotated by means of a wrench or other tool engaged with the flat faced portion 16 at one end of said screw. The long arm of the lever 7 is connected by a link 17 to the arm 5 on the wick shaft of the lamp or burner and on its short arm is slidably arranged a weight 18 adapted to be retained in adjusted position by a set screw 19.

For the purpose of enabling the device to be set to maintain any desired degree of temperature in the compartment or chamber heated an adjustable connection is preferably provided between the heater and the thermostatically operated lever, such connection being effected in the embodiment of the invention shown in Fig. 1 by forming the end of the lever 7 with an eye $7^b$ which slidably receives the link or rod 17 and which contains a set screw $7^c$ for maintaining the connecting rod or link in adjusted position. It will be seen that when the set screw $7^c$ is loosened the connecting rod 17 may be raised or lowered to vary the size of the flame of the lamp. In other embodiments of the invention other adjustable means may be provided for setting the heating device so that the amount of heat generated by it may be regulated.

From the foregoing it will be seen that by arranging the screw 9 so as to extend on opposite sides of the pivotal axis of the lever, the nut 10 may be moved nearer to or farther from such pivotal axis and thereby adjustably connect the thermostat so that it will actuate the lever to a greater or less extent when affected by changes in temperature. By arranging the thermostatic device on the exterior of the incubator or other chamber or compartment to be heated, it will be affected by variations in exterior atmosphere and will automatically control the lamp or other heater of such compartment so that a uniform temperature will be maintained in the same.

While I have shown and described in detail the application of one embodiment of the invention especially adapted for use in connection with an incubator or the like, I wish it understood that the invention may be adapted to and used for regulating the temperature in a chamber or compartment of any description. For instance, in Fig. 3 of the drawings I have shown a slightly different embodiment of the invention adapted for controlling a furnace $2^a$ or other heater of a house or building, one wall of which is indicated at $1^a$. The dampers of the heater $2^a$ are connected to a sliding link $17^a$ which projects through the wall $1^a$ and is connected to the lever $7^a$ of a thermostatic device arranged upon the exterior of the house or building so as to be affected by the exterior atmosphere. As illustrated, said lever $7^a$ is pivoted at one of its ends at $13^a$ on a support $6^a$. Said lever $7^a$ has swiveled upon it an adjusting screw $9^a$ for a nut $10^a$ which is pivotally connected to a thermostat $8^a$ pivotally mounted on the support $6^a$.

Having thus described the invention what is claimed is:

1. A thermostatic temperature regulator comprising controlling means, a lever, means actuated by the lever for controlling a heater, a thermostat, and an adjustable connection between the thermostat and lever, said connection being shiftable longitudinally of the lever whereby the thermostat may be connected to the lever at points closer to or farther from the axis of its pivot.

2. A thermostatic temperature regulator comprising controlling means, a lever, means actuated by the latter for controlling a heater, a member carried by the lever and disposed in parallel relation thereto, said member being also disposed in a plane at right angles to the axis of the pivot of the lever, and a thermostat carrying a part shiftable longitudinally of said member.

3. A thermostatic temperature regulator comprising controlling means, a lever, means actuated by the same for controlling a heater, a screw carried by the lever and extending longitudinally thereof and in a plane at right angles to the axis of the pivot of said lever, a thermostat, a nut engaged with said screw and connected to said thermostat.

4. A thermostatic temperature regulator comprising a lever, means actuated by the latter for controlling a heater, a screw swiveled on said lever and extending longitudinally thereof and in a plane at right angles to the axis of the pivot of said lever, a pivotally mounted thermostat and a nut pivotally connected to said thermostat and arranged on said screw.

5. A thermostatic temperature regulator comprising a lever having an enlarged portion provided with oppositely projecting pivots, said enlarged portion of the lever being formed with an opening and having bearing ears struck up from it at said opening, bearings for the pivots of said lever, a screw having its ends rotatable in said bearing ears whereby said screw is swiveled and disposed in parallel relation to said lever, and in a plane at right angles to the axis of its pivots, a pivotally mounted thermostat, a nut upon said screw and pivotally connected to said thermostat, and means actuated by said lever for controlling a heater.

6. A thermostatic temperature regulator comprising a lever having an enlarged portion provided with oppositely projecting pivots, said enlarged portion of the lever being formed with an opening and having bearing ears struck up from it at said opening, a U-shaped bearing plate for the pivots of said lever, a screw swiveled in said bearing ears and disposed in parallel relation to said lever, a thermostat pivotally connected to said U-shaped bearing plate, a nut upon said screw and pivotally connected to said thermostat, and means actuated by said lever for controlling a heater.

In testimony whereof I hereunto affix my signature in the presence of two witnesses.

DON O. NATION.

Witnesses:
FRANK TUTTLE,
C. D. NATION.